June 30, 1953  L. S. CARROLL  2,643,598
FLEXIBLE INFLATABLE AND DEFLATABLE GLOBE
AND PROCESS OF MANUFACTURE
Filed Aug. 17, 1949

INVENTOR
*Laurence S. Carroll*
BY
*Pennie, Edmonds, Morton and Barrows*
ATTORNEYS Patented June 30, 1953

2,643,598

UNITED STATES PATENT OFFICE 2,643,598

FLEXIBLE INFLATABLE AND DEFLATABLE GLOBE AND PROCESS OF MANUFACTURE

Laurence S. Carroll, Great Neck, N. Y.

Application August 17, 1949, Serial No. 110,695

11 Claims. (Cl. 95—76)

My invention relates to improvements in flexible inflatable and deflatable globes and to the process and apparatus for making such globes.

The idea of providing a collapsible rubber globe having geographical or astronomical delineations thereon was conceived many years ago, as evidenced, for example, by the patent granted to Cornelius D. Hite in 1887, No. 257,994. However, in spite of this disclosure and other related proposals, globes of this type were apparently never manufactured or introduced in commerce. One reason for this may be that no satisfactory way had been found for making reasonably accurate globes on a commercial scale or at a price low enough to permit of commercial distribution. The rigid type of globes having any reasonable degree of accuracy now in use are so expensive that it is not possible for the average person to own one, and even the schools are poorly equipped in this respect.

The primary object of my invention is, therefore, to provide improved inflatable and deflatable globes or spheres of the type described which will be so inexpensive to manufacture that they may have a wide distribution and may be made available to classrooms and schools, to the various departments of the government, and to the ordinary person interested in various phases of geography, astronomy, advertising and other fields.

A further object of my invention is to provide flexible inflatable balloon type globes having a sufficiently high degree of accuracy and at a price so that they may be available to students of geography, navigation, astronomy and other subjects pertaining to the earth or the heavens.

Another object of my invention is to provide portable globes which may be deflated or sold deflated in relatively small packages.

A still further object of my invention is to provide an improved process and apparatus by which flexible portable globes of the type referred to may be manufactured inexpensively and rapidly.

According to my invention, the improved globes may carry indicia representing various subjects pertaining to the earth or the heavens, for example, oceans, seas, countries, empires, spheres of influence, rivers, cities, shipping lanes, airline routes, agricultural areas, animal life, industries, races of mankind, religious groups, cultures, political influences, minerals, languages, explorations, tides, trade winds, glacial ages, time zones, temperature zones, weather, oceanography, ichthyology, etc. In many of these instances, the globe of course will contain the conventional indicia including lines representing meridians of longitude and parallels of latitude. Other types of globes or spheres may be provided for toys or educational purposes, and some left blank, except for the lines of latitude and longitude, so that students may draw in the continents, oceans or other features, or prepare adhesive cut-outs adapted to be applied to the inflated globes.

Globes or spheres of the type under consideration are particularly advantageous for use in the air forces, or for air transport companies, since they may be packed in very small packages or tubes and inflated when desired for use. Another important large-scale use of globes made in accordance with the present invention is in the schools of the country, where at the price for which the globes may be sold, each classroom may have one or several such globes. Furthermore, books on geography, astronomy, industries, etc., may include a deflated globe showing the world conditions with respect to the particular subject.

The improved globe of my invention is characterized by being made of flexible material so that it may be inflated or deflated, such material having therein or thereon a layer including fixed or developed photographic material containing indicia representing a particular subject for which the globe is made.

Another important feature of my invention comprises an inflatable and deflatable globe having photographically applied indicia visible on its surface, the globe comprising a gas-tight casing of flexible material spherical in shape when inflated, and a gas-supply tube mounted in the casing and extending therethrough at the position of a diameter of the globe when inflated, said tube being secured to the casing at the two points a diameter length apart, whereby gas may be supplied to and withdrawn from the casing and the diameter of the globe at the position of the tube determined.

In a further form of the invention, I provide a gas supply stand for the globe having a tube of the type described, the stand carrying a gas-supply means, a removable tubular support for the tube of the globe, valve means for admitting gas from the supply means through the tubular support and the globe tube to the globe for inflating the same, and a valve controlled means on the stand for releasing the gas from the globe. The globe may be inflated in any conventional means.

According to my invention, I provide an improved apparatus for manufacturing globes of the type described above, such apparatus among other things including a rigid transparent globe carried by a support, such transparent globe having thereon the selected representations or indicia to be applied to the flexible globes, and an opening in the transparent globe, as for example at the position of the south pole, through which collapsed inflatable globes carrying a photographic emulsion may be inserted for inflation therein and exposed to light.

Having in mind the apparatus referred to above for use in manufacturing inflatable globes of flexible material, my process comprises in general the steps of providing a flexible casing structure including therein or thereon a photographic emulsion of the type of a photographic positive, such emulsion may be either for black and white photographs or for colored photographs, inserting the casing bearing the emulsion into the rigid transparent globe, inflating the casing to bring its exterior surface into engagement with the interior surface of the transparent globe, exposing the exterior surface of the inflated casing through the transparent globe to light for the required time, deflating the casing and removing it from the transparent globe, and subjecting the exposed casing to a photographic finishing process to fix the indicia on or in the casing material.

My invention includes other features, objects and advantages, and it is described in detail hereinafter in connection with the illustrative embodiments thereof shown in the accompanying drawings forming a part of this application.

Figure 1:
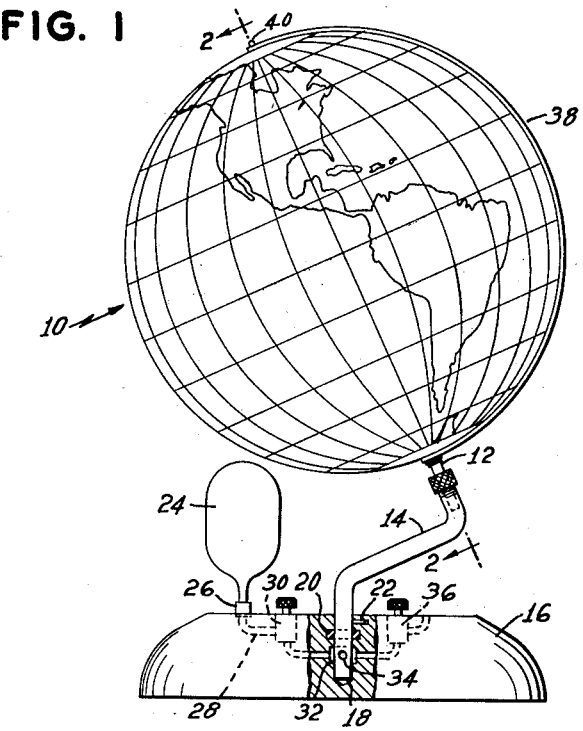
Fig. 1 is a side elevational view of a flexible inflatable and deflatable globe supported by a base structure including means for inflating and deflating the globe, the assembly being constructed and arranged in accordance with my invention.

In Fig. 1 the arrangement comprises a globe 10 having a flexible wall of rubber or plastic material, and as illustrated, carries the indicia of the lines of longitude and latitude as well as a map of the world, representations of the western hemisphere, including North and South America being shown. The globe 10 in the form illustrated is carried by a gas supply tube 12 fixed to the wall of the globe and extending in swivelling relation to a supporting tube 14 set in a supporting base 16. The base 16 as illustrated may be of plastic, metal or wood and is provided with a central bore 18 into which the tube 14 extends, the tube 14 being sealed with respect to the bore 18 by a rubber or other ring gasket 20 through which the tube 14 is pressed. The tube 14 carries a pin or projection 22 which serves as a bayonette type connection when inserted and turned in a receiving slot in the material of the base 16.

The base 16 in the illustrated form carries a gas supply and inflating arrangement including, for example, a known type of pressure container 24 such as those known as "Sparklet," and containing compressed carbon dioxide. In place of this a pump may be used. The container 24 is secured to the base connection by a connector 26 which in turn is connected by a duct 28 and to a valve 30 to a passageway 32 for supplying gas through a hole 34 to the tube 14 and the tube 12 for inflating the globe 10. When it is desired to deflate the globe, a valve 36 is operated to permit the gas to escape from the globe. The lower portion of the tube 14 may be tapered slightly so that it is readily inserted in the bore 18 to engage the gasket 20 with considerable friction so that no gas is permitted to escape. Furthermore, the tube 14 advantageously has the bends indicated, so that the tube 12 will be at the correct angle and its lower end swiveled in the upper end of the tube 14, thereby permitting rotation of the globe as desired.

The globe 10 carries a plastic ribbon or strip 38 having the degrees printed thereon at the proper positions, to indicate the degrees of latitude around the arc of the globe. This strip 38 has a hole at its upper end, fitting over a pin or projection 40 carried by the globe, and a hole at its lower end fitting around the tube 12. The strip 38 is preferably flexible, so that when the globe is deflated it will readily fold or bend into a small space, and when the globe is inflated it will indicate approximately the extent to which the globe should be inflated.

Figure 2:
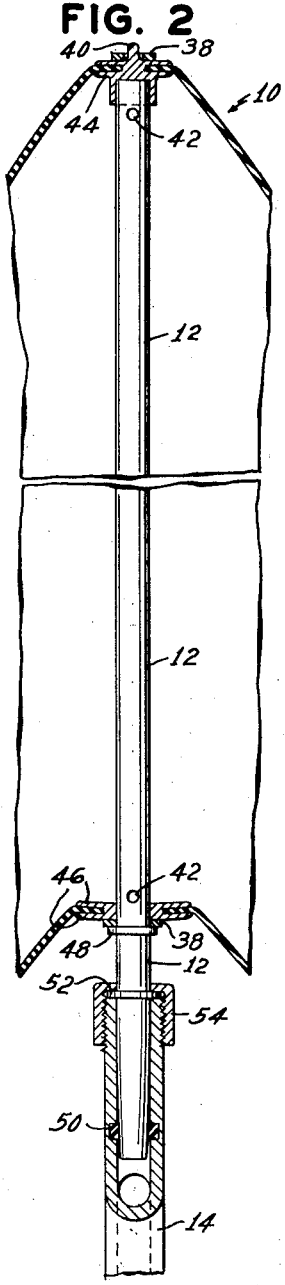
Fig. 2 is an enlarged broken view partly in section of the globe and associated structures taken on the line 2—2 of Fig. 1, but showing the casing deflated.

One method of securing the tube 12 to the wall of the globe and the structure of the tube 12, together with its swivel joint connection with the tube 14, is shown more in detail in Fig. 2, from which it will be noted that the tube 12 is provided with holes 42 inside the globe adjacent the opposite portions of the wall to which the tube is secured. The upper end of the tube 12 is secured to the wall by means of an end fixture 44 cemented to the end of the tube 10 and provided with flanges, for example, of plastic material, between which the globe wall is secured and cemented. The fixture 44 has a central portion extending through a hole in the globe wall to provide the projection 40, but the end structure may be made in various ways and the tube 12 may be of plastic or metal. The hole in the globe wall through which the portion of the fixture 44 extends serves as a convenience for orienting the end of the tube, but the projection 40 may be cemented to the globe wall where a different structure is employed.

The lower portion of the tube 12 is secured to the globe wall between plastic washers 46 which are cemented to the wall and attached in sealed relation to the tube with cement or with a plastic solvent, as is commonly done in joining plastic materials. The strip 38 may be held adjacent the lower portion of the globe by a snap-on ring 48 or by cementing on a plastic ring or half ring.

The gas-tight joint between the lower end of the tube 12 and the upper portion of the tube 14 which will permit swivelling of the tube 12 in the tube 14, may conveniently comprise a gasket 50 (Fig. 2) through which the lower end of the tube 12 is forced in sealing engagement, the tube being retained in place by means of a flange 52 fixed thereto which rests against the top of the tube 14 and which is held against displacement but free to rotate by means of a threaded coupling member 54.

A modified structure may be provided for the upper end of the tube 12 so that it opens out through the top and receives a small diameter light tube for lighting the globe, the tube 12 in such case of course being transparent. The light fixture secured in the upper end of the tube 12 will of course be gas-tight where the upper opening 42 is utilized. On the other hand, the upper part of the tube 12 may extend through the wall of the globe and be dammed off above the lower opening 42 so that the narrow light globe may be inserted. In another form, the end fixture 44 may be provided with an opening through the top to receive the narrow light tube and current may be supplied to the light tube in either of these modifications by providing spaced inlaid current leads in the member 38, which then may be connected from the base of the globe to a light cord in the usual way.

A light may be provided in the tube 12 as illustrated and have the wire terminals therefrom extend substantially to the lower end of the tube so that they connect up with wires provided in the tube 14 when the end of the tube 12 is inserted therein. Suitable conventional contact rings may be provided for this purpose.

The material of the wall of the globe as made is generally referred to as "flexible material" such as various types of plastics now being used for the manufacture of inflated articles, or it may be of one of the various forms of rubber or elastic polymers and plastic-like materials, so that the globe when inflated will have a relatively tight feel and appearance.

In carrying out the process of my invention, the globe structure is formed and mounted, for example, in the manner illustrated in Fig. 2, after which it is inflated and a photographic light-sensitive emulsion in either the regular black and white type or the color positive type is then sprayed or otherwise applied to the entire surface of the inflated globe, such application of course being carried out in the dark. The coated inflated globe is then subjected to a drying operation to dry the emulsion thereon.

Figure 4:
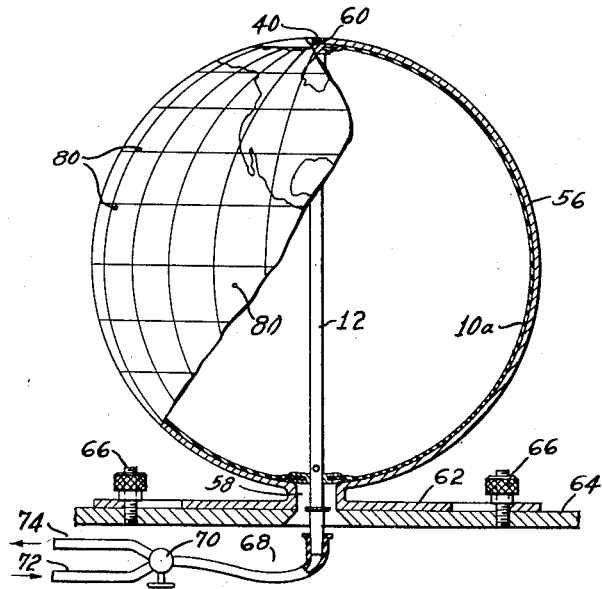
Fig. 4 is a broken elevational view partly in section of a rigid wall globe structure for use in connection with the process of the present invention.

Assuming that the globe is constructed in the form shown in Fig. 2, for purposes of illustration, the globe containing the dried emulsion is deflated and then inserted into a transparent hollow rigid globe 56 of plastic or glass, shown in Fig. 4. A Lucite globe is suitable for the purpose and on its exterior surface it carries the desired indicia which are to be applied to the flexible globes. In the present illustration the rigid globe 56 carries the lines of longitude and latitude as well as the outlines of the various land masses of the earth, some of which are indicated. These indicia will appear in positive just as they will be photographed onto the flexible globes. The globe 56 is provided with an opening 58, at the position of the south pole, large enough to insert the deflated globes, particularly when the material of the wall of the globe is rather snugly pressed around the tube 12. When inserting the deflated globe the projection 40 is advantageously pushed in so that it engages a hole 60 at the position of the north pole of the rigid globe 56. This will serve to orient the flexible globe in the rigid globe and any other suitable means may be replied upon to orient the lower end of the tube 12 in the opening 58.

In the illustrated form of the rigid globe it is provided with a horizontal flange 62 by which it is secured to a work-table or bench 64 by means of bolts 66.

After the flexible globe is inserted in the rigid globe 56, it is connected up to a gas supply source such as air or carbon dioxide under pressure by means of a hose connection 68 which may be simply slipped over the end of the tube 12. As soon as the flexible globe is inflated so that its wall engages the inside wall of the rigid globe 56, the operator turns on a light, not shown, to effect the desired length of exposure, after which the operator turns off the light, deflates the flexible globe, for example, by the operation of a three-way valve 70, which is connected to a line 72 to a pressure source and by a line 74 to a vacuum or suction apparatus. As soon as the globe is deflated, it is withdrawn from the rigid globe 56 by the operator, and then moved to a subsequent station where it is again inflated to approximately the proper size, and placed in a developer solution to finish the photographic image on the surface of the globe. The globe is removed from the fixing bath, dried, and is then ready for packing or for use.

Figure 3:
Fig. 3 is an enlarged broken sectional view showing one form of casing wall structure.

The wall of the finished flexible globe is illustrated in Fig. 3 and comprises a plastic or rubber material 76 which is gas-tight and which carries a thin photographic layer 78 resulting from the development of the photographic emulsion. The wall 76 may be made of a plastic material which is flexible and which is elastic when made into the flexible globe 10. Such a globe may be inflated to the correct size or approximately so, and then the elastic properties of the plastic reduced by a polymerizing operation while the globe is inflated, so that when the globe is processed in accordance with the process of the present invention it will still be flexible, but have very little elasticity which would enable it to expand beyond the predetermined spherical size.

While the stand 16 has been illustrated as a permanent stand for a particular globe, it may be used for inflating other globes or in the process of manufacturing the globes according to the present invention, it being understood, of course, that the lower end of the tube 12 or the neck of the globe will be provided with some form of valve or closure means so that the gas will not escape when the globe is removed from the tube 14.

In making the balloon globes on a commercial scale, the balloons may be carried on hose connections while they are alternately inflated and deflated in the various operations, or they may be connected up each time by the operator. The drying of the balloons with the photographic emulsion thereon and after developing may be effected by carrying the balloons along on inflation connections or they may be provided with valves or stoppers to keep them inflated for the required length of drying time.

The rigid globe 56 is advantageously drilled with a number of pin holes distributed over its area, for example, at the location of cities, or the intersections of the longitude and latitude lines, so as to permit air to escape from the rigid globe when the flexible globe is inflated. Some air will escape through the hole 60 and opening 58, but various other small drill holes indicated at 80 are advantageously provided.

The indicia provided on the rigid globe 56 will ordinarily be drawn in opaque lines and the lettering will be opaque for black and white reproductions. In the case of colored reproductions the lines, lettering and lettering outlines and designs, etc., can be applied to the surface of the rigid globe with dies, transparent inks and paints or photographs.

The photographic emulsion applied to the flexible globes may be applied to the internal surfaces or to the external surfaces, or may be applied as a composite part of the globe wall structure. Where the emulsion is applied inside the flexible globe the solution may be introduced through the tube 12 and the holes 42 and withdrawn therefrom in the same way. The drying is somewhat more difficult in this case, but air may be circulated through the globe by forcing it through a tube inserted in the tube 12, the air flowing through the upper hole 42 and out the lower hole 42.

Where the balloons are made to represent terrestrial subjects such as various types of global maps, they are advantageously positives in the photographic reproduction process. This effect is achieved by a photographic reversal during the developing process, as is done in the case of colored reproduction. Where, however, the flexible globes are to be used to represent the heavens, they remain as negative reproductions. In this way, the stars and the planets and lettering can be applied to the rigid globe and will be reproduced on the flexible tube as white on the entire surface of photographic black.

The rigid globe 56 which forms the photographic positive in the process is readily made in the form illustrated, but, if desired, it may be made in hemispheres. Rigid printing positives in the form of a complete globe is advantageous because it permits the printing of the flexible globes in one piece and at a single exposure, thereby avoiding the piecing together of segments and resulting misalignments and errors. The wall of the rigid globe 56 may be relatively thin, therefore the photographic reproductions are as accurate as the rigid positive. Furthermore, the indicia applied to the surface of the rigid globe is readily and easily done by an artist either in color or black and white, and it is a simple matter to make additions or erasures. In the making of certain types of terrestrial globes transparencies may be used, such as Kodachromes of animals, people, ships and even maps, all of which can be applied to the rigid globe surface for reproduction on the flexible globes at the desired positions. Different rigid globes will be used for different subjects.

The process and apparatus of the present invention may be employed in the making of printed globes of flexible material; for example, rubber globes, which do not include tube 12 and its connections, may be printed by simply providing the conventional rubber neck connection either with or without a valve. Such flexible globes whether made of rubber or plastic may be processed in the apparatus described and illustrated, and the flexible globes alternately inflated and deflated as the steps in the process may require.

I claim:

1. The method of photographically printing indicia upon an inflatable and deflatable globe, the wall of which is made of flexible material, comprising inflating the globe to approximately the final desired size and applying thereto a light-sensitive photographic material, deflating the globe and inserting it into a rigid hollow transparent globe bearing the indicia to be printed upon the flexible globe, inflating the flexible globe in the rigid globe so that the outer surface of the flexible globe engages the inner surface of the rigid globe, exposing the sensitized surface of the flexible globe to light through the rigid globe, deflating the flexible globe and removing it from the rigid globe, and developing the indicia on the flexible globe, the rigid globe being provided with means for permitting the escape and admission of air therefrom when the flexible globe is inflated and deflated therein, respectively.

2. The method of photographically printing indicia upon an inflatable and deflatable globe having a wall of flexible material carrying a light sensitive photographic emulsion comprising inserting the flexible globe in deflated condition into a rigid hollow transparent globe carrying the indicia to be printed upon the flexible globe, inflating the flexible globe in the rigid globe until the outer surface of the flexible globe engages the inner surface of the rigid globe, exposing the light-sensitive emulsion on the flexible globe to light through the rigid globe, removing the flexible globe from the rigid globe, and developing the indicia on the flexible globe, the rigid globe being provided with means for permitting the escape and admission of air therefrom when the flexible globe is inflated and deflated therein, respectively.

3. The method as claimed in claim 2 in which the flexible globe is removed from the rigid globe by first deflating the flexible globe.

4. The method as claimed in claim 3 in which the flexible globe is deflated by applying suction thereto whereby the material of the wall of the globe is compacted.

5. An apparatus for photographically printing selected indicia on flexible inflatable and deflatable globes comprising a rigid hollow transparent globe having said selected indicia applied to its outside surface, said globe being provided with an opening for inserting a deflated flexible globe into the rigid globe, and means for inflating the flexible globe inside of the rigid globe, the rigid globe being provided with means for permitting the escape of air therefrom when the flexible globe is inflated therein.

6. An apparatus as claimed in claim 5 characterized by including means for orienting the flexible globe in the rigid globe, and means for deflating the flexible globe in the rigid globe.

7. An apparatus as claimed in claim 5 characterized in that the rigid globe has a plurality of distributed perforations through its wall surface for permitting escape of air from the rigid globe when the flexible globe is inflated therein.

8. The method as claimed in claim 2, characterized by including the step of orienting the flexible deflated globe with respect to the indicia on the hollow globe prior to inflating the flexible globe in the hollow globe.

9. The method of photographically printing indicia upon a flexible inflatable and deflatable globe having a wall of flexible material and a gas supply tube mounted therein and extending through the wall of the globe at the position of one diameter of the globe when inflated, said tube being secured to the wall of the globe at two points separated by a distance equal to the diameter of the globe when inflated, comprising supplying a gas through the tube and inflating the globe to approximately the final desired size, applying a light-sensitive photographic material to the outer surface of the inflated globe, deflating the globe around the tube and inserting it into a rigid hollow transparent globe bearing the indicia to be printed upon the flexible globe, positioning the inserted end of the tube at a predetermined point in the rigid hollow globe, inflating the flexible globe in the rigid hollow globe by introducing a gas through the tube so that the outer surface of the flexible globe engages the inner surface of the rigid globe, exposing the sensitized surface of the flexible globe to light through the rigid hollow globe, deflating the flexible globe around the tube and removing it from the rigid hollow globe, and developing the indicia on the flexible globe, the rigid globe being provided with means for permitting the escape and admission of air therefrom when the flexible globe is inflated and deflated therein, respectively.

10. The method of photographically printing indicia upon an inflatable and deflatable globe having a wall of flexible material carrying a light sensitive photographic emulsion, said globe being carried on a gas supply tube extending through the wall of the globe at the position of one diameter of the globe when inflated and having its wall secured thereto at two points separated by a distance equal to the diameter of the globe when inflated, one end of the tube extending outside the globe at one of said points for the supply and removal of gas to and from the globe, comprising inserting the flexible globe in deflated condition into a rigid hollow transparent globe having an opening therein and carrying the indicia to be printed upon the flexible globe with said end of the tube extending through said opening, positioning the other end of the tube at a point in said rigid globe diametrically opposite said opening, inflating the flexible globe in the rigid globe by introducing gas through the extending end of said tube until the outer surface of the flexible globe engages the inner surface of the rigid globe, exposing the light-sensitive emulsion on the flexible globe to light through the rigid globe, deflating the flexible globe, removing the flexible globe through the opening in the rigid globe, and developing the indicia on the flexible globe, the rigid globe being provided with means for permitting the escape and admission of air therefrom when the flexible globe is inflated and deflated therein, respectively.

11. The method as claimed in claim 10, characterized in that the end of the tube opposite said extending end includes a positioning means and the rigid globe diametrically opposite the opening therein includes a means for receiving the positioning means, and upon inserting the flexible globe through the opening in the rigid globe locating said positioning means in the means in the rigid globe for receiving the positioning means, whereby said flexible globe is oriented in the rigid globe with respect to the indicia carried on the rigid globe.

LAURENCE S. CARROLL.

References Cited in the file of this patent

UNITED STATES PATENTS

| Number | Name | Date |
| --- | --- | --- |
| 169,950 | Brown | Nov. 16, 1875 |
| 1,206,867 | Lewis | Dec. 5, 1916 |
| 2,436,085 | Amering | Feb. 17, 1948 |
| 2,437,229 | Mears | Mar. 2, 1948 |
| 2,491,386 | Miller et al. | Dec. 13, 1949 |